US012078713B1

United States Patent
Bloechl (10) Patent No.: US 12,078,713 B1
(45) Date of Patent: *Sep. 3, 2024

(54) REAL-TIME LOCATION SYSTEM USING SEQUENCED WIRELESS COMMUNICATIONS PROTOCOLS FOR SCHEDULING TIMINGS OF NODE SYNCHRONIZATION AND TIME DIFFERENCE OF ARRIVAL RANGING BETWEEN NODES

(71) Applicant: Link Labs, Inc., Annapolis, MD (US)

(72) Inventor: Mark O Bloechl, Elkridge, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,563

(22) Filed: Dec. 8, 2023

Related U.S. Application Data (63) Continuation-in-part of application No. 18/125,419, filed on Mar. 23, 2023, now Pat. No. 11,852,713.

(51) Int. Cl.
*G01S 13/34* (2006.01)
*H04W 64/00* (2009.01)

(52) U.S. Cl.
CPC ......... *G01S 13/343* (2013.01); *H04W 64/006* (2013.01)

(58) Field of Classification Search
CPC .. G01S 13/343; G01S 13/0209; H04W 56/00; H04W 56/001; H04W 4/025; H04W 36/322

See application file for complete search history.

(56) References Cited

U.S. PATENT DOCUMENTS

| 6,128,490 | A  | 10/2000 | Shaheen et al. |
| 7,321,331 | B2 | 1/2008  | Andric et al. |
| 7,817,579 | B2 | 10/2010 | Ramirez et al. |
| 7,978,674 | B1 | 7/2011  | Oroskar et al. |
| 9,788,151 | B2 | 10/2017 | Duan et al. |
| 10,200,886 | B2 | 2/2019  | Duan et al. |
| 10,264,436 | B1 | 4/2019  | Wohler et al. |
| 10,408,917 | B2 | 9/2019  | Ye et al. |
| 10,444,321 | B2 | 10/2019 | Pu et al. |

(Continued)

FOREIGN PATENT DOCUMENTS

| KR | 102146527 B1 | 8/2020 |
| WO | 2020212722 A1 | 10/2020 |

(Continued)

OTHER PUBLICATIONS

International Search Report and Written Opinion issued in application No. PCT/US2024/020940 dated Jul. 11, 2024.

*Primary Examiner* — Timothy X Pham
(74) *Attorney, Agent, or Firm* — Charles B. Lobsenz; Brian H. Buck; Potomac Law Group, PLLC (57) ABSTRACT

Provided are a system and method for coordinating dual wireless communications protocols when implementing a time difference of arrival (TDOA) framework for ranging between nodes. A first of the protocols (e.g., BLE) can be used for transmission of synchronization and TDOA schedules that prescribe synchronization and TDOA frames. The synchronization and TDOA frames can then be executed according to a second of the protocols (e.g., UWB), thus exemplifying an efficiency in energy consumption owing to an absence of transitioning between the first and second protocols transmissions throughout the schedules.

18 Claims, 6 Drawing Sheets

(56) References Cited

U.S. PATENT DOCUMENTS

| | | |
|---|---|---|
| 10,708,970 B2 | 7/2020 | Bloechl et al. |
| 10,779,118 B2 | 9/2020 | Duan et al. |
| 10,845,451 B1 | 11/2020 | Bloechi |
| 10,862,520 B1 | 12/2020 | Bloechi |
| 11,200,805 B2 | 12/2021 | Ye et al. |
| 11,259,143 B2 | 2/2022 | Duan et al. |
| 11,259,144 B2 | 2/2022 | Duan et al. |
| 11,470,448 B2 | 10/2022 | Ye et al. |
| 11,519,999 B2 | 12/2022 | Rybalko et al. |
| 2005/0288003 A1 | 12/2005 | Matsumura |
| 2006/0160544 A1 | 7/2006 | Sun et al. |
| 2008/0186231 A1 | 8/2008 | Aljadeff et al. |
| 2012/0295623 A1 | 11/2012 | Siomina et al. |
| 2019/0135229 A1 | 5/2019 | Ledvina et al. |
| 2019/0174332 A1 | 6/2019 | Duan et al. |
| 2020/0106877 A1 | 4/2020 | Ledvina et al. |
| 2020/0382902 A1 | 12/2020 | Ye et al. |
| 2020/0404450 A1 | 12/2020 | Duan et al. |
| 2021/0027631 A1 | 1/2021 | Ye et al. |
| 2021/0029493 A1 | 1/2021 | Duan et al. |
| 2021/0029500 A1 | 1/2021 | Ye et al. |
| 2021/0105736 A1 | 4/2021 | Tancerel et al. |
| 2021/0158637 A1 | 5/2021 | Kincaid et al. |
| 2021/0282112 A1 | 9/2021 | Zhan |
| 2022/0011398 A1 | 1/2022 | Duan et al. |
| 2022/0013177 A1 | 1/2022 | Li et al. |
| 2022/0014875 A1 | 1/2022 | Rybalko et al. |
| 2022/0058950 A1 | 2/2022 | Ye et al. |
| 2022/0171012 A1 | 6/2022 | Duan et al. |
| 2022/0210620 A1 | 6/2022 | Wahl et al. |
| 2022/0268875 A1 | 8/2022 | Szebenyel et al. |
| 2022/0272488 A1 | 8/2022 | Pekhteryev et al. |
| 2022/0317235 A1 | 10/2022 | Ye et al. |
| 2022/0377752 A1 | 11/2022 | Zhbankov et al. |
| 2022/0386270 A1 | 12/2022 | Suresh |
| 2022/0390586 A1 | 12/2022 | Ye |
| 2022/0394660 A1 | 12/2022 | Werner et al. |
| 2023/0067130 A1 | 3/2023 | Duan et al. |
| 2023/0071850 A1 | 3/2023 | Ye et al. |
| 2023/0095932 A1 | 3/2023 | Ye et al. |
| 2023/0106904 A1 | 4/2023 | Ljung |
| 2023/0110357 A1 | 4/2023 | Kämäräinen et al. |
| 2023/0156424 A1 | 5/2023 | Lee et al. |

FOREIGN PATENT DOCUMENTS

| | | |
|---|---|---|
| WO | 2022046479 A1 | 3/2022 |
| WO | 2022125393 A1 | 6/2022 |

REAL-TIME LOCATION SYSTEM USING SEQUENCED WIRELESS COMMUNICATIONS PROTOCOLS FOR SCHEDULING TIMINGS OF NODE SYNCHRONIZATION AND TIME DIFFERENCE OF ARRIVAL RANGING BETWEEN NODES

CROSS-REFERENCE TO RELATED APPLICATIONS

This application is a continuation-in-part application of application Ser. No. 18/125,419, filed Mar. 23, 2023, the entire contents of which are hereby incorporated by reference.

FIELD OF THE DISCLOSURE

Disclosed embodiments relate to wireless communications systems and the operation thereof, and more specifically, to arranging sequencing for node localization across separate wireless communications nodes and to impart to such sequencing scheduling of synchronization and time difference of arrival (TDOA) ranging timings among nodes according to a dedication of use of the separate wireless communications protocols, where such scheduling enables conservation of energy consumption among involved wireless nodes.

BACKGROUND

Wireless communications protocols which are operative to enable the exchange of information between objects are varied in both their purposes and capabilities. Among such protocols are BLUETOOTH, BLUETOOTH LOW ENERGY (BLE), THREAD, and ULTRA-WIDEBAND (UWB). Each of such protocols can be advantageous for their respective utility, where that utility can be dictated by certain considerations. For example, BLE may have various utility in circumstances where energy consumption is of paramount importance given that operable nodes lay dormant in between on-air connections. As another example, nodes which are operable according to the UWB protocol can achieve a far narrower scope of ranging estimation than that which can be obtained when implemented by BLE governed nodes. Yet, due to such superiority in ranging, energy consumption by UWB nodes may be at a premium. This is particularly the case where localization according to UWB is achieved according to a time difference of arrival (TDOA) regime as against localization using time of flight (TOF), i.e., two-way ranging (TWR), where the distance between nodes is deduced from the roundtrip flight time of signaling therebetween. In this regard, it is well-recognized that ranging errors in real-time location systems (RTLS) implementing TDOA can significantly skew desired accuracy when contributory ranging nodes are not synchronized in their respective transmissions of ranging signaling. In other words, since TDOA is dependent upon determining respective node location due to an analysis of arrival times of spatially separated signaling, it is necessary to time synchronize that signalizing to ensure analysis of a same time signal. In known implementations of such synchronization, synchronized UWB receivers can scan for and timestamp transmissions of a tag to be located. As a result, these transmissions can then be forwarded to a central location where reception time differences are compared to determine a location of the tag, i.e., through known hyperbolic intersection of the transmissions. Sometimes, however, synchronization of these receivers to a required resolution can be difficult, such that clock distribution is required. Further, a node to be located can be left without any indication that its signaling has been received in some instances. Such difficulty can arise, for example, when an insufficient number of receivers acquire transmissions from the tag, thus causing the tag to repeatedly transmit until such time that it has received a sufficient number of corresponding acknowledgements of its signaling.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments herein may include a system and commensurate method providing a real-time location system (RTLS), including at least one tag, and at least one beacon pod having a master beacon (MB) and at least first through third slave beacons (SBs). The MB may be communicable with the SBs and the at least one tag to enable the at least one tag to determine a location thereof according to a time difference of arrival (TDOA) framework in which each of the SBs are synchronized with the MB. In these regards and in the time difference of arrival (TDOA) framework, each of the at least one tag, the MB, and the SBs include first and second wireless communications protocols (P1, P2). Further in these regards and according to a single MB transmission on the P1 to each of the SBs and the at least one tag, each of the SBs and the at least one tag receive a synchronization schedule prescribing signaling with the MB on the P2 that is initiated by each of the SBs and/or a TDOA frame schedule.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of", "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising." "including," "carrying," "having." "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

As will be discussed, embodiments herein may encompass signaling on one or more devices equipped according to an "XLE" wireless communications protocol, wherein such protocol is a low energy consumption protocol such as BLE or THREAD, and otherwise a UWB protocol, or, for example, on a combination of such protocols relative to selective operations between system nodes (i.e., wireless communications nodes (WCNs)) that exchange such signaling. When conducting signaling that is available for ranging among nodes represented by the various devices, it can be advantageous to coordinate use of the combination of protocols to reduce energy consumption at the nodes. For instance, and as will be understood from the discussion(s) below, such coordination can be implemented in accordance with an arranged sequencing of discrete use of one protocol over another for a dedicated purpose such as node synchronization and thereafter the use of another protocol dedicated to enabling calculation of ranging between nodes.

Figure 1:
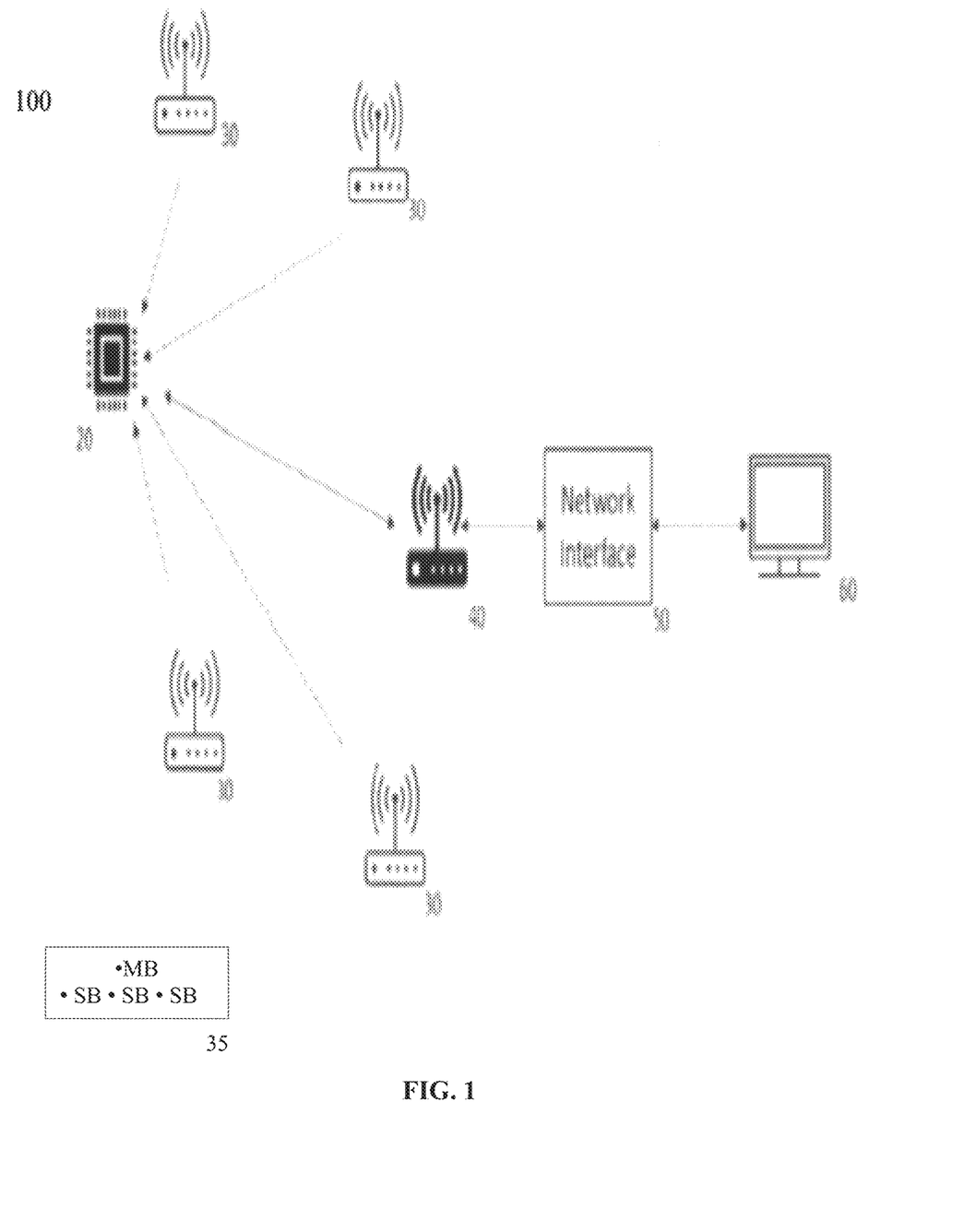
FIG. 1 is an illustration of a system providing wireless communications in accordance with embodiments herein.

Referring to FIG. 1, a description of a communications system 100 according to an embodiment is provided. System 100 and its components may each be configured to be operable in accordance with one or more of XLE and UWB protocols, such that each of the aforementioned components are configured for communications according to a selected one of such protocols at a first time and the other of such protocols at a second time. System 100 typically includes multiple tags 20—only one is shown in FIG. 1 for clarity. Tag 20 may be attached to or associated with a particular object for the purposes of tracking a changing location of that object. Tags 20 are capable of wirelessly communicating with other components of system 100 as more fully described herein. System 100 also includes a plurality of beacons 30 which also communicate wirelessly with other components of system 100 such as with tags 20. Beacons 30 are located at very specific geographic coordinates within the area within which objects are to be tracked. Beacons 30 are installed in these locations and during the time of installation, their specific locations are entered into system 100 so that system 100 is always aware of the known exact physical locations of each such beacon 30. In some implementations, one or more of the beacons 30 shown in FIG. 1 may be aggregated into a beacon pod 35 comprising a master beacon (MB) and one or more, optionally three (3), slave beacons (SBs) for purposes as later described herein.

System 100 may also include one or more access points 40. These access points 40 may also serve in the same capacity as one or more beacons 30 in that their location is known to system 100 and such that they may communicate with tags 20 as described herein for the purpose of location determination as more fully described herein. In addition, access points 40, if present, also provide a connection to network interface 50 which permits data to be shared with and received from other networks such as the internet. This functionality may alternatively be provided by one or more beacons 30 in lieu of access point 40. In one embodiment, data is transmitted and received via backhaul to the internet such that a cloud based application may be accessed by a user via client 60 to view object location information and also to allow the user to configure various aspects related to the functionality of system 100.

Tags 20 are responsible for executing any coordinate location determination process locally and then reporting the location determination to system 100 via a communication to an access point 40 (or a beacon 30). In an embodiment, each tag 20 may individually report such a corresponding location determination via its own respective backhaul. See, for example, U.S. Pat. No. 10,264,436 entitled, "BLE NETWORKING SYSTEMS AND METHODS PROVIDING CENTRAL AND PERIPHERAL ROLE REVERSAL WITH INDEPENDENT PERIPHERAL NETWORK CONNECTIVITY," which is commonly owned by the assignee of the present application and incorporated by reference herein.

Figure 2:
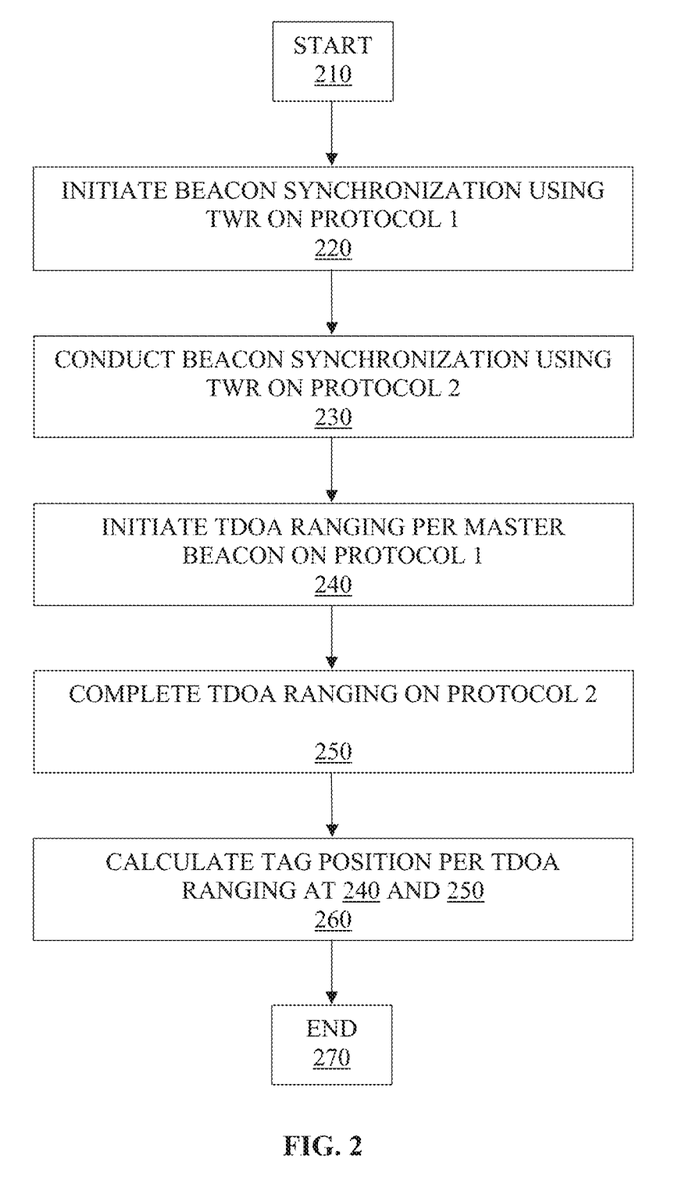
FIG. 2 is a sequence diagram illustrating, in accordance with the system of FIG. 1, a manner of arranging sequencing for node localization across separate wireless communications protocols.

In this regard and when referring to FIG. 2, XLE communications between a tag 20 and a beacon 30 may occur according to a "role reversal" where the tag 20 is responsible for determining its location, i.e., after first receiving a beacon advertisement that can be a trigger for the location determination process to begin at the tag 20. An exemplary discussion of one or more aspects which are descriptive of the reversal are provided in U.S. Pat. No. 10,708,970 entitled, "BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL," which is commonly owned by the assignee of the present application and incorporated by reference herein. Analogously, a respective tag 20 and beacon 30 pair may, according to embodiments herein, execute such same role reversal so as to thereafter employ UWB communications following the aforesaid XLE communications.

It is to be understood by one of ordinary skill in the art that each of the tag 20 and each beacon 30 may be implemented by all appropriate software and/or hardware for carrying out location technologies included in the discussion herein, e.g., TOF and/or TDOA measurements according to respectively designated XLE or UWB protocol.

In the carrying out of processes according to these technologies, it can be of the utmost benefit to weigh energy consumption according to wireless communications protocols with which each of a tag 20 and a beacon 30 (or beacons 30 of a beacon pod 35) may be equipped. Such weighing, for instance, may be impacted by certain constraints of one or more of these protocols, e.g., line of sight impediments which are characteristic of UWB. That is, it can be beneficial to first attempt communications between nodes according to a protocol, such as XLE, which is freed of these and other impediments when first attempting the establishment of communications between nodes. In a case when the communications are thus established, further operable protocol, such as UWB, can then be employed. In this way, implementation of the initial communication can reduce energy consumption (e.g., by avoiding line of sight impediment(s)) where, for instance and as is understood, XLE communication can be more economical than that of UWB in a process of, for example, establishing TWR.

On the basis of such economy, and where clock synchronization among nodes is crucial to accuracy in localization according to a TDOA regime, employing TWR in an initial stage targeted at obtaining that synchronization presents, according to embodiments herein, an optimization for energy consumption. As such, relevant synchronization aimed at achieving accuracy in TDOA measurement at a tag 20 is now discussed with regard to a manner of arranging sequencing for localization techniques (e.g., TWR and TDOA) across separate wireless communications protocols (e.g., XLE including BLE or THREAD as protocol 1, and UWB as protocol 2).

Beginning at 210, a MB, of a beacon pod 35, is configured to, at 220, initiate according to XLE, or protocol 1, an advertisement intended for obtaining synchronized transmission clock cycling among slave beacons (SBs) of the relevant pod (here, shown as Slave Beacon 1, 2, and 3). The advertisement may include a synchronization flag indicating that the purpose of the advertisement is clock synchronization with the MB and targeted at a particular SB according to its media access control (MAC) address. Such advertisement is repetitively transmitted until such time as acknowledged by the targeted SB.

The acknowledgement may comprise a request by the identified SB to begin the synchronization process in response to the SB detecting the synchronization flag. One or more parameters of the advertisement may comprise that the synchronization, according to the transmitted request, be conducted according to TWR as between the MB and the targeted SB on a differing protocol, i.e., protocol 2 or UWB. In this regard, the MB may, at 230, open transmit and receive windows for an exchange of TWR signaling to determine a TOF between the MB and the targeted SB. As is contemplated with respect to a given beacon pod 35, such exchanges may occur, in succession, as between the MB and each of included SBs. In other words, the sequence of protocol 1 and protocol 2 communications between the MB and a respective SB may be discretely repeated for each SB within the beacon pod 35, and where the TOF synchronization amount as to each SB is stored by the MB and such SBs. Once synchronization with each of the SBs in a respective pod 35 is complete, the MB may initiate, as at 240, TDOA ranging on protocol 1. That is, such a MB may begin signaling for a TDOA measurement frame so as to provide each of the SBs and tag 20 in receipt thereof an initial reference time, $t_{n0}$ (i.e., an initial reception time for the frame at a respective node). Here, advertisements attributable to the MB lack the aforementioned synchronization flag, i.e., such a flag is absent from the advertisements. Thus, as a result of this initial reference time being received at the tag 20 and each SB transmitting respective signaling in accordance with scheduling thereof, the tag 20 may then be operative to determine its location according to a TDOA regime, according to protocol 2. The scheduling of signal transmission from each of the SBs may be in accordance with the following: $t_n = t_{n0} - \Delta_{n0} + (n \times d)$, where $t_n$ represents transmission timing for a respective SB, $t_{n0}$ represents the frame reference transmission time of the MB, $\Delta_{n0}$ represents the measured transmission delay between the MB and a respective SB (i.e., the TOF between the MB and such respective SB determined during synchronization at 230 and representing a synchronization amount as between a SB and the MB), n is the relative SB indication (e.g., $1^{st}$, $2^{nd}$, etc. according to for, example, MAC identification) within a pod 35, and d represents a constant delay timing as indicated by the MB in its protocol 1 transmission that began the TDOA measurement frame. That is, d can represent a delay between when the MB first begins its TDOA protocol 2 transmission and when a respective SB is scheduled to begin its TDOA protocol 2 transmission according to the $\Delta_{n0}$ synchronization amount setting a time for such transmission. With this scheduling in place, each of the SBs can transmit to the tag 20 according to protocol 2 so as to complete, as at 250, a beacon portion of the TDOA ranging, i.e., as between constituent SBs of the beacon pod 35 and the tag 20 due to an initial transmit by the MB on protocol 2 having been received by each of the SBs and the tag 20.

Given that each SB has implemented its associated synchronization amount relative to MB transmission during synchronization in order to thus shift it scheduled protocol 2 TDOA transmission to the tag 20, synchronization between the MB and each SB is achieved from the tag's perspective. Accordingly, the tag 20 may proceed to, as at 260 and prior to ending sequencing operations at 270, calculate its position per the TDOA ranging at 240 and 250. For instance, as is explained with reference to FIG. 3, as described below, the tag 20 can delineate a beginning of the TDOA frame (as represented by an initial protocol 1 transmission from the MB lacking the synchronization flag) to derive each individual SB transmission time. As is discussed in more detail below, timing for each such individual SB transmission can be determined according to the above referenced $\Delta_{n0}$, representing a synchronization amount as between the MB and each SB. Such an amount, in providing a temporal shift compensating for a transmission time delay as between the MB and a respective SB, can further be accounted for in the constant delay d defining a difference in MB and SB protocol 2 transmissions.

Figure 3:
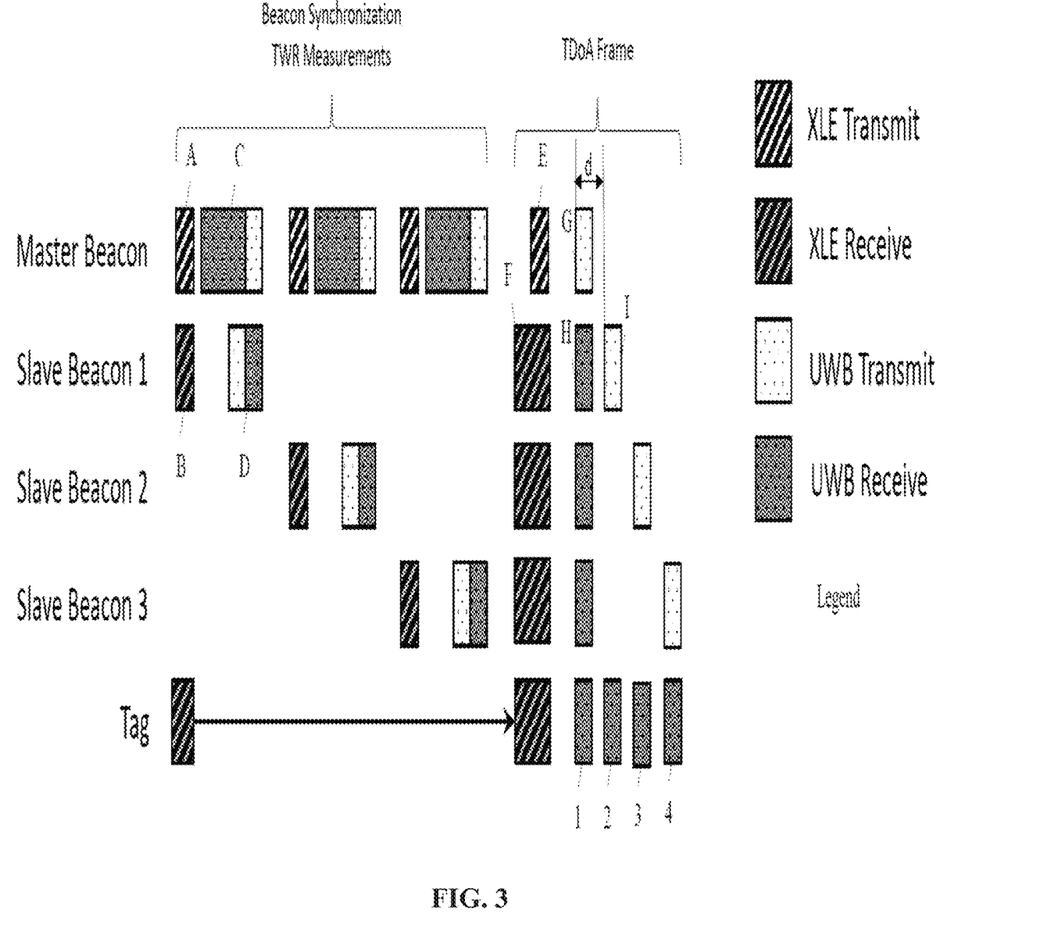
FIG. 3 is a schematic diagram illustrating communications among various system nodes of FIG. 1, in accordance with the sequencing of FIG. 2.

In referring to FIG. 3 providing a schematic diagram illustrating communications among various system nodes of FIG. 1, in accordance with the sequencing of FIG. 2, there is detailed a diagrammatic representation of beacon synchronization and TDOA signaling as between beacons, of a beacon pod 35, and the tag 20.

Diagrammatically, therefore, there is illustrated MB-SB synchronization operations in conjunction with the aforementioned TDOA measurement frame enabling a tag 20 to conduct TDOA ranging aimed at enabling that tag 20 to determine its location relative to signaling transmitted by a MB and SBs of a beacon pod 35. In an exemplary fashion, each of the MB and SB are listed as denoted, as is the tag 20.

Therein, synchronization as between the MB and each constituent SB is initiated according to protocol 1, or XLE, and then transitioned to protocol 2, or UWB, when determining a TWR measurement as between the MB and a respective SB. For simplicity, a cycle of transmissions "A" through "D" are explicitly illustrated as between the MB and SB1, wherein such a cycle can be respectively repeated according to a MB advertisement indicating a successive respective SB (e.g., SB2 or SB3) according to MAC identification and included synchronization flag. As such, the aforementioned cycling can begin at "A" where the MB transmits an advertisement that is acknowledged by the respective SB1, at "B," to begin TWR as a result of detection of the synchronization flag. In response, the MB and SB1 may engage in an exchange of transmissions, at "C" and "D" and according to protocol 2 to a establish a TOF measurement therebetween. As a result, the MB and SB1 record such measurement for purposes of TDOA ranging, as is later described. Throughout, the tag 20 lays dormant in view of detection of the synchronization flag requiring synchronization measurement among the MB and the SBs.

Once having cycled through constituent SBs of its constituent beacon pod 35, the MB then reverts to protocol 1, as is shown, to emit signaling, as at "E," setting parameters for a TDOA frame as between each of the pod SBs and the tag 20, as received commonly by SB1-SB3 and tag 20 at shown iterations of "F." Owing to not detecting the synchronization flag from the MB advertisement, the tag 20 is caused to open receive windows according to protocol 2, and each SB is caused to transmit signaling to the tag 20 according to protocol 2 (as described below). This is the case since such an MB advertisement indicates that one of such parameters includes conducting TDOA measurements as between the MB, SBs and the tag 20 according to protocol 2. As such, the MB can broadcast its advertisement for receipt by the pod SBs at indicated iterations of "H" and by the tag 20 at "1." Thereafter, and in order to maintain synchronization with the MB, SB1 transmits at "I" according to its above referenced timing, $t_n$, that implements its synchronization amount, $\Delta_{n0}$. That is, SB1 shifts its transmission timing so as to be offset from the MB advertisement by the amount "d," representing the constant delay indicated by the MB in its protocol 1 transmission at "E" for each respective beacon. In this way, "d" can equate to a difference in timing between a timing of the MB transmission at "G" and a timing for a respective SB transmission at a respective iteration of "I." In other words, "d" can, in some embodiments, encompass the synchronization amount, $\Delta_{n0}$, that enables synchronization between the MB and a respective SB. Upon transmission, tag 20 can receive the SB1 transmission at "2." Thus, as may be understood, relative synchronization amounts for transmissions from SB2 and SB3 can be "2d" and "3d," respectively, as measured from "G" for respective transmissions "I," corresponding to SB2 and SB3, and received at "3" and "4." Aspects of relative interactions between a MB and a SB of a beacon pod 35 herein can, with synchronization for time of transmission being compared to phase-coherence, parallel interactions occurring between master and slave beacons as are provided in U.S. Pat. No. 11,412,472 entitled, "SYSTEM AND METHOD FOR GENERATING PHASE-COHERENT SIGNALING VIA CALIBRATED PHASE SYNCHRONIZATION FACTORS AMONG WIRELESS RANGING NODES IN A PHASE-BASED TIME DIFFERENCE OF ARRIVAL FRAMEWORK," which is commonly owned by the assignee of the present application and incorporated by reference herein.

Having received the MB's protocol 2 transmission at "1" and each respective SB1-SB3 transmission at "2" through "4," respectively, the tag 20 is equipped to simply subtract an appropriately corresponding magnitude of "d" from each SB timestamp at "2" through "4" when evaluating its position according to a conventional TDOA analysis. Accordingly, where the delay "d" can encompass the above-discussed synchronization amount $\Delta_{n0}$, the tag 20 can perceive each SB transmission as having been emitted precisely at a timing marked by a respectively corresponding interval of "d."

Implementations according to FIGS. 1-3 above describe a particular method of arranging sequencing between multiple wireless protocols when enabling the tag 20 to determine its location and all the while minimizing energy consumption at each of the tag 20 and beacons 30. Relatedly, implementations according to FIGS. 4-6 discussed below further interpret that sequencing to implement scheduled timings for execution of various above-described synchronization and TDOA ranging activities corresponding to protocols 1 and 2. In particular, such execution can include delineation of when, relative to transmission of a MB advertisement, synchronization between intended SBs and TDOA ranging to a tag 20 will occur. In this way, for instance, protocol 1 transmission during a TDOA frame as is shown in FIG. 3 can be omitted since the MB advertisement can prescribe the TDOA frame schedule and frame rate and thus be independent of any protocol 1 transmission interval. Resultingly, energy consumption at the tag 20 (associated with required continual scanning for available beacons previously under protocol 1) is reduced, as is such consumption among targeted SBs given the lack of need to switch between protocol 1 and protocol 2 radios thereof.

As background for one or more implementations of the aforementioned scheduling as will be discussed hereinbelow, the reader is referred to FIG. 4. Therein, TDOA ranging between the tag 20 and beacon pod 35 of FIG. 1 is expanded to include multiple opportunities for such ranging relative to beacon pods 36, 38, and 40 comprising SB1, SB2, and SB3; SB4, SB5, and SB3; and SB6, SB7, and SB3, respectively. As will be observed, the aforementioned beacon pods may have in common exemplary SB3, such that the multiplexing for such SB may be implemented according to expediting of synchronization and TDOA ranging afforded by relevant scheduling therefor as broadcast by respective MBs including MB1, MB2, and MB3. Herein, it will be understood that the number of beacon pods and their constituent beacons, as well as the number of tags are merely exemplary as more than those shown may be contemplated and be in satisfaction of the discussed implementations.

Figure 5:
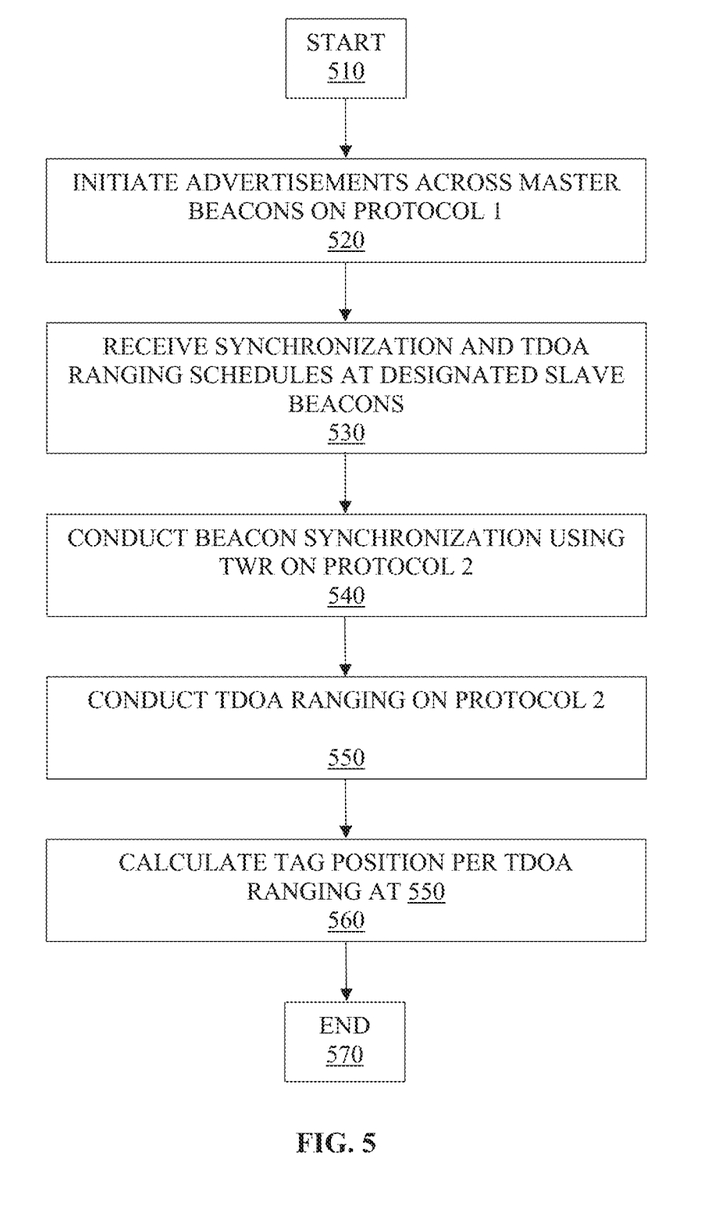
FIG. 5 is a sequence diagram illustrating, in accordance with TDOA ranging conducted in FIG. 4, a process of sequencing wireless communications protocols when synchronizing various wireless communications nodes and then conducting the TDOA ranging according to the sequencing.

Relative to synchronization and TDOA ranging that may occur for one or more of beacon pods 35, 36, 38 and 40, FIG. 5 sets forth a sequencing of scheduling of synchronization and time difference of arrival (TDOA) ranging timings among nodes (i.e., beacons and tags) according to a dedication of use of the wireless communications protocols 1 and 2. In this regard, it is contemplated that such dedication prescribes that an initial communication or advertisement from a MB to corresponding SBs (i.e., via MAC address assignment to the MB as part of a pod) and the tag 20 occur on protocol 1. Here, and has been discussed, operability on such protocol can be beneficial in that energy consumption is reduced owing to avoidance of protocol 2, i.e., UWB, constraints such as line of sight.

In this regard and when referring to FIG. 5 beginning at 510, one or more exemplary MBs associated with pods 35, 36, 38, and 40 are configured to, at 520, initiate respective advertisements (i.e., a single advertisement to each SB of a pod) on protocol 1, or XLE. As is explained below in further reference to FIG. 6, such advertisements can be received by each of the SBs dedicated to the respective pods and the tag 20. At 530, each of the SBs and tag 20 can receive the advertisements. Here, such advertisements can include first and second schedules received by each of the SBs in which the schedules respectively correspond to synchronization and TDOA frame schedules prescribing synchronization and TDOA start times. Relative to the broadcast advertisement, that which is received by the tag 20 can be exempted from the synchronization schedule such that only TDOA frame timing is provided prescribing when the MB will initiate the forthcoming TDOA frame according to the TDOA schedule received at 530. In these regards, each of the SBs and the tag 20 can, after receiving and storing the pertinent scheduling, enter a sleep state until activation under the scheduling is appropriate. Thus, according to the advertisements and owing to only a single XLE or protocol 1 broadcast intended for the advertisements, each of respective pod SBs can engage, at 540, in conducting with pertinent MBs beacon synchronization using TWR on protocol 2, i.e., UWB. Once synchronization among SBs is completed and having received TDOA timing in the initial MB advertisement, respective SBs enter a sleep state prior to a TDOA frame among one or more MBs beginning on protocol 2 at 550. Accordingly and with measurements for the TDOA frame having been concluded, the tag 20 may proceed to, as at 560 and prior to ending sequencing operations at 570, calculate its position per the TDOA ranging at 550, inclusive of receipt of protocol 2 transmissions from each of the MBs and respective pod SBs. That is, relative to an initial MB advertisement as discussed above, each of SBs and the tag 20 can, at the outset of the TDOA frame, receive a protocol 2 transmission from the MB that begins such frame according to the TDOA schedule. As will be understood from the depictions in FIG. 4, in a case in which one or more SBs are shared among beacon pods, such SBs may be multiplexed such that the tag 20 may calculate its location in accordance with a selectively chosen proximity to a most near beacon pod, as is further discussed below.

Figure 4:
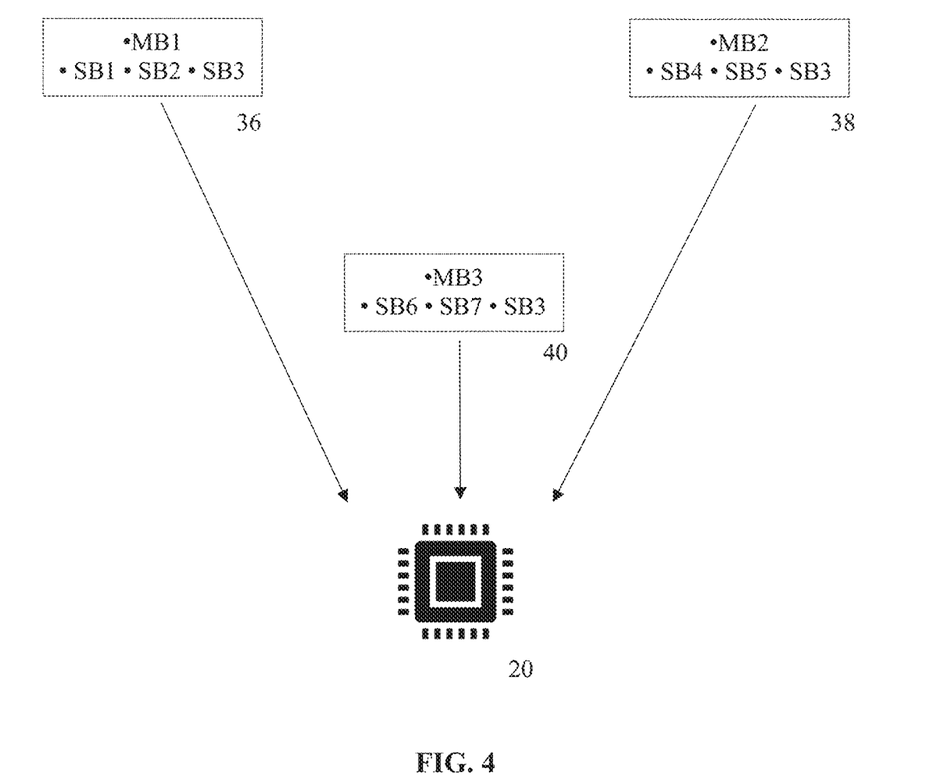
FIG. 4 is a high-level diagram illustrating time difference of arrival (TDOA) ranging between one or more wireless communications nodes according to FIG. 1.
Figure 6:
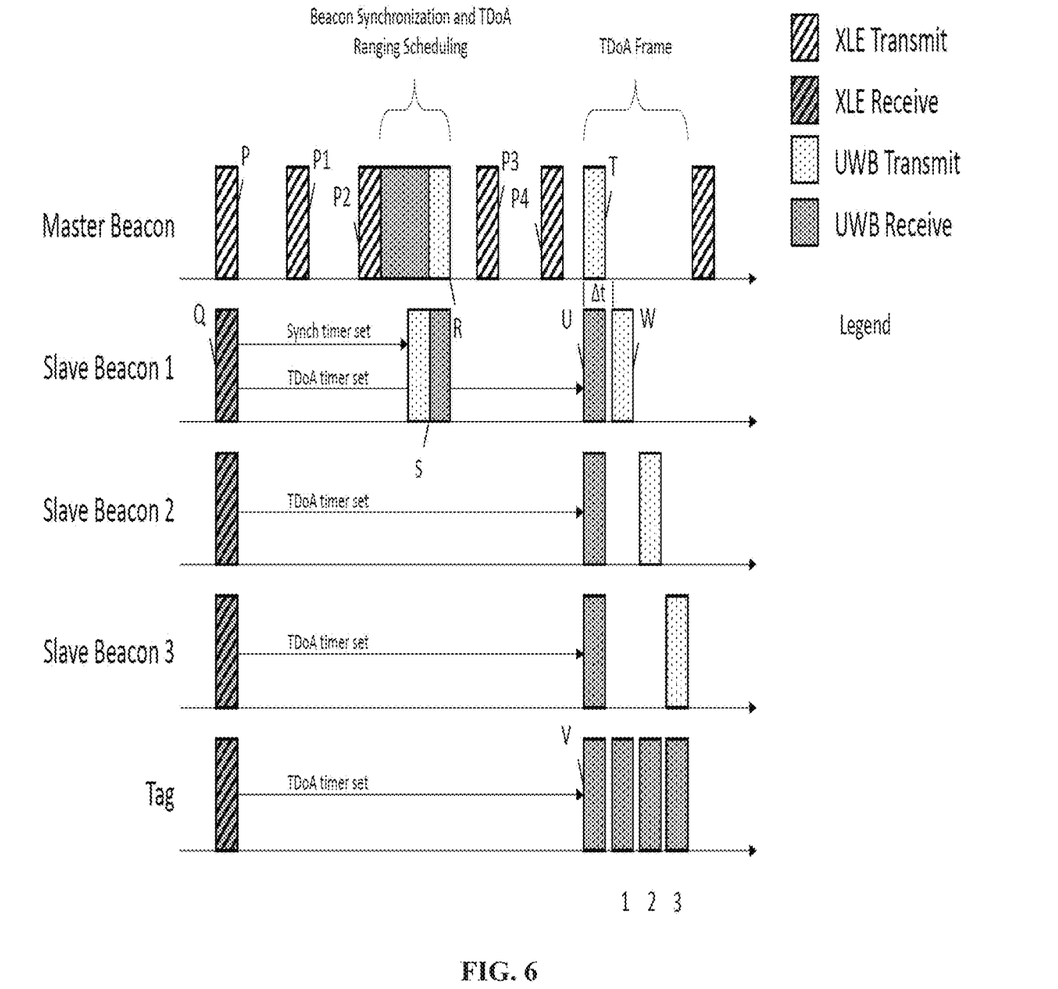
FIG. 6 is a schematic diagram illustrating communications among various system nodes of FIG. 4, in accordance with the sequencing of FIG. 5.

In referring to FIG. 6 providing a schematic diagram illustrating communications among various system nodes of FIGS. 1 and 4, in accordance with the sequencing of FIG. 5, there is detailed an exemplary diagrammatic representation of beacon synchronization and TDOA signaling as between beacons, of a beacon pod 35, and the tag 20.

Diagrammatically, therefore, there is illustrated MB-SB synchronization operations in conjunction with the aforementioned TDOA measurement frame enabling a tag 20 to conduct TDOA ranging aimed at enabling that tag 20 to determine its location relative to signaling transmitted by a MB and SBs of a beacon pod 35, 36, 38 and/or 40. In an exemplary fashion, each of the MB and SBs are listed as denoted, as is the tag 20.

Therein, and for each of SBs of a respective beacon pod, the constituent MB can broadcast its advertisement "P" (and repeat the same according to "P1-P4" to enhance reliability and opportunity for capture) to effect synchronization and TDOA ranging scheduling. As indicated, the advertisement is effected according to protocol 1, or XLE, for receipt at each of the beacons and tag 20 at iterations of "Q." As has been discussed, such an advertisement like that of "P" contains two (2) sets of schedules. A first schedule sets forth synchronization timing stored by each SB, i.e., a period providing start and end times in which TWR synchronization with a MB and a SB (according to its designated MAC address) will occur on protocol 2, or UWB. For instance, and with respect to synchronization as between a MB and SB1, the SB1 enters a sleep state after receipt of the synchronization schedule and then, according to the schedule, awakens to engage in a cycle of protocol 2 transmission that may derive according to ordered transmissions "S" and "R" given that the cycle is initiated at the SB1. Upon conclusion of the cycle, the SB1 returns to its sleep state only to awaken for detection of a TDOA frame broadcast on protocol 2 from the MB that begins the TDOA frame (according to the TDOA frame scheduling). As will be appreciated and in the interest of clarity, only one such cycle (timer setting, etc.) is depicted as other MB-SB cycling will occur relative to completion of that cycle so that each SB within a pod may be synchronized with its MB. A second schedule sets forth TDOA frame timing stored by each SB and the tag 20, and which simply sets forth (a) an initial start time for when each SB and the tag 20 will awaken to receive an MB transmission beginning the TDOA frame and (b) when each SB will awaken from a sleep state after receipt of the MB transmission to then transmit on protocol 2 to the tag 20 during the TDOA frame.

With respect to the aforementioned TDOA frame, the MB for a respective pod may begin its protocol 2 transmission at "T," which is received at each of the SBs at iterations of "U" and by the tag 20 at "V." As such, transmission "T" serves as a trigger to each of the SBs to start to enter a sleep state and start their countdown to awaken for protocol 2 transmission to the tag 20, which remains in an awakened state during the TDOA frame. As indicated with reference to the exemplary SB1 according to the second schedule, transmission from the SB1 at "W" and received at the tag 20 at "1" can be offset from the initial MB transmission by $\Delta t$, representing a differential in time from when such initial transmission occurred and when the SB1 transmission was scheduled. As prescribed by the second schedule, it will be understood that consecutive transmissions from SB2 and SB3 according to $2\Delta t$ and $3\Delta t$, respectively, are received at the tag at "2" and "3." Having received the MB's protocol 2 transmission at "V" and each respective SB1-SB3 transmission at "1" through "3," respectively, the tag 20 is equipped to simply subtract an appropriately corresponding magnitude of "$\Delta t$" from each SB timestamp at "1" through "3" when evaluating its position according to a conventional TDOA analysis. As will be understood as is shown, synchronization for another TDOA frame may begin (e.g., as depicted to the right of the transmission receipt "3" by the XLE transmit) as the tag 20 continually updates its location.

Relative to the above synchronization and TDOA schedules distributed according to MB advertisement(s), one of ordinary skill in the art will appreciate the realization of multiple advantages enabled by the distribution. For instance, since TDOA scheduling can be derived from a same MB advertisement as is a synchronization schedule, scanning for MB advertisement by SBs can be completed once their expected (i.e., programmed) MB advertisement receipts are completed for constituent pods as are depicted in FIG. 4. In this way, battery consumption at SBs can be significantly reduced due to the absence of having to scan for MB advertisement which are not intended. Yet another advantage resulting from the herein discussed scheduling can be reduced battery consumption at the tag 20. In particular, since the tag 20 can narrow its location via gradient descent (see U.S. patent Ser. No. 10/986,467, entitled, "APPARATUS AND METHOD FOR GEOLOCATING A TAG RELATIVE TO A THRESHOLD VIA PHASE-BASED TIME DIFFERENCE OF ARRIVAL FRAMEWORK, which is commonly owned by the assignee of the present application and incorporated by reference herein) when in receipt of multiple MB advertisement to ascertain whether it is within a perimeter of (i.e., most near) a respective beacon pod, tag sleep and wake cycles can be efficiently transitioned according to the targeted advertisement of the MB of the perimeter pod. That is, upon determining its TDOA location as to relativity of the perimeter of a respective beacon pod, the tag 20 can queue its timers to sleep and wake cycles according to TDOA scheduling set forth by the respective MB advertisement of that respective beacon pod determined to be most near (according to gradient descent, for example), as is discussed above in relation to FIGS. 5-6. Still yet another advantage is the opportunity for increased tag location accuracy given placement and operational capacity of multiple beacon pods that can be "tiled" or spread across a targeted area of interest for locating the tag. That is, such an accuracy is supported in view of increased temporal efficiency for synchronization and TDOA ranging intervals (due to the aforementioned distribution thereof) enabling multiplexing of SBs among beacon pods while avoiding UWB collision(s).

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer.

Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A real-time location system (RTLS), comprising:
   at least one tag; and
   at least one beacon pod comprising a master beacon (MB) and at least first through third slave beacons (SBs), in which the MB is communicable with the SBs and the at least one tag to enable the at least one tag to determine a location thereof according to a time difference of arrival (TDOA) framework in which each of the SBs are synchronized with the MB,
   wherein
   in the time difference of arrival (TDOA) framework, each of the at least one tag, the MB, and the SBs comprise first and second wireless communications protocols (P1, P2), and
   according to a single MB transmission on the P1 to each of the SBs and the at least one tag, each of the SBs and the at least one tag receive a synchronization schedule prescribing signaling with the MB on the P2 that is initiated by each of the SBs and/or a TDOA frame schedule.

2. The RTLS of claim 1, wherein:
   the P1 and the P2 comprise BLUETOOTH LOW ENERGY (BLE) and ULTRA-WIDEBAND (UWB), respectively.

3. The RTLS of claim 2, wherein:
   in response to each of the SBs receiving the synchronization schedule, each of the SBs enter a sleep state and awaken at a time according to the respective synchronization schedule therefor after which each of the SBs synchronize with the MB according to a cycling of signaling on the P2.

4. The RTLS of claim 3, wherein:
   each of the SBs return to the sleep state upon conclusion of the synchronization.

5. The RTLS of claim 4, wherein:
   in response to the at least one tag receiving the TDOA frame schedule, the at least one tag enters a respective sleep state and awakens according to the TDOA frame schedule to receive signaling on the P2 from the MB and each of the SBs.

6. The RTLS of claim 5, wherein:
   in response to each of the SBs receiving, as part of the TDOA frame schedule, a MB transmission on the P2 to the at least one tag and indicating initiation of a TDOA measurement frame, each of the SBs awaken from respective sleep states thereof and transmit signaling on the P2 to the at least one tag according to the TDOA frame schedule.

7. The RTLS of claim 6, wherein:
   the at least one tag determines the location thereof, according to the TDOA framework, based on the TDOA frame schedule signaling on the P2 from the MB and each of the SBs.

8. The RTLS of claim 7, wherein:
   the at least one beacon pod comprises a plurality of beacon pods in which one or more of the respective SBs are shared thereamong the plurality of beacon pods and receive signaling from one or more of the respective MBs on each of the P1 and the P2 to respectively execute the synchronization and TDOA frame schedules.

9. The RTLS of claim 8, wherein:
   the at least one tag calculates the location thereof, according to the TDOA framework, based on the TDOA frame schedule signaling on the P2 from the respective MB and SBs determined by the at least one tag to be most near the at least one tag based on a gradient descent analysis.

10. A method of determining a tag location according to a real-time location system (RTLS), the method comprising:
providing at least one tag; and
providing at least one beacon pod comprising a master beacon (MB) and at least first through third slave beacons (SBs), in which each beacon is communicable with the at least one tag to enable the at least one tag to determine a location thereof according to a time difference of arrival (TDOA) framework,
wherein
in the time difference of arrival (TDOA) framework, each of the at least one tag, the MB, and the SBs comprise first and second wireless communications protocols (P1, P2), and
according to a single MB transmission on the P1 to each of the SBs and the at least one tag, each of the SBs and the at least one tag receive a synchronization schedule prescribing signaling with the MB on the P2 that is initiated by each of the SBs and/or a TDOA frame schedule.

11. The method of claim 10, wherein:
the P1 and the P2 comprise BLUETOOTH LOW ENERGY (BLE) and ULTRA-WIDEBAND (UWB), respectively.

12. The method of claim 11, further comprising:
in response to each of the SBs receiving the synchronization schedule, each of the SBs entering a sleep state and awakening at a time according to the respective synchronization schedule therefor after which each of the SBs synchronize with the MB according to a cycling of signaling on the P2.

13. The method of claim 12, wherein:
each of the SBs return to the sleep state upon conclusion of the synchronization.

14. The method of claim 13, further comprising:
in response to the at least one tag receiving the TDOA frame schedule, the at least one tag entering a respective sleep state and awakening according to the TDOA frame schedule to receive signaling on the P2 from the MB and each of the SBs.

15. The method of claim 14, further comprising:
in response to each of the SBs receiving, as part of the TDOA frame schedule, a MB transmission on the P2 to the at least one tag and indicating initiation of a TDOA measurement frame, each of the SBs awakening from respective sleep states thereof and transmitting signaling on the P2 to the at least one tag according to the TDOA frame schedule.

16. The method of claim 15, wherein:
the at least one tag determines the location thereof, according to the TDOA framework, based on the TDOA frame schedule signaling on the P2 from the MB and each of the SBs.

17. The method of claim 16, wherein:
the at least one beacon pod comprises a plurality of beacon pods in which one or more of the respective SBs are shared thereamong the plurality of beacon pods and receive signaling from one or more of the respective MBs on each of the P1 and the P2 to respectively execute the synchronization and TDOA frame schedules.

18. The method of claim 17, wherein:
the at least one tag determines the location thereof, according to the TDOA framework, based on the TDOA frame schedule signaling on the P2 from the respective MB and SBs determined by the at least one tag to be most near the at least one tag based on a gradient descent analysis.

* * * * *